United States Patent [19]
Gliemeroth

[11] 3,938,977
[45] Feb. 17, 1976

[54] PROCESS FOR PRODUCING PHOTOCHROMICITY IN UNTREATED GLASSES OF SUITABLE COMPOSITION BY A TEMPERATURE TREATMENT IN A LIQUID

[75] Inventor: Georg Gliemeroth, Mainz-Mombach, Germany

[73] Assignee: Jenaer Glaswerk Schott & Gen., Mainz, Germany

[22] Filed: June 19, 1973

[21] Appl. No.: 371,546

[30] Foreign Application Priority Data
June 22, 1972 Germany............................ 2230506

[52] U.S. Cl....................... 65/30 R; 65/33; 65/117; 65/DIG. 2
[51] Int. Cl.$^2$..................... C03B 25/00; C03C 21/00
[58] Field of Search .... 65/30, 33, 117, 118, DIG. 2; 106/DIG. 6

[56] References Cited
UNITED STATES PATENTS

| | | | |
|---|---|---|---|
| 3,208,860 | 9/1965 | Armistead et al. | 65/33 X |
| 3,282,770 | 11/1966 | Stookey et al. | 65/30 |
| 3,317,297 | 5/1967 | Ray | 65/30 |
| 3,357,876 | 12/1967 | Rinehart | 65/30 X |
| 3,419,370 | 12/1968 | Cramer et al. | 65/30 X |
| 3,451,797 | 6/1969 | Meth | 65/117 X |
| 3,464,807 | 9/1969 | Pressau | 65/33 |
| 3,493,963 | 2/1970 | Buckley | 65/30 |
| 3,524,739 | 8/1970 | Loukes et al. | 65/30 X |
| 3,544,437 | 12/1970 | Loukes et al. | 65/30 X |
| 3,628,934 | 12/1971 | Duthoit | 65/30 |

FOREIGN PATENTS OR APPLICATIONS

| | | | |
|---|---|---|---|
| 125,353 | 2/1959 | U.S.S.R. | 65/30 |

*Primary Examiner*—S. Leon Bashore
*Assistant Examiner*—Kenneth M. Schor
*Attorney, Agent, or Firm*—Millen, Raptes & White

[57] ABSTRACT

Photochromic glass compositions are photochromically activated by immersion in a hot liquid bath at activation and/or annealing temperatures to provide improved thermal efficiency and control of the degree of activation, making possible the rapid production of uniform photochromic glass products. The hot liquid bath is a molten salt bath having a density very close to that of the glass composition. A silver salt may be employed in the salt bath to prevent silver diffusion from the glass, the required amount of silver being already present in the glass prior to its immersion in the salt bath. The glass is not simultaneously ion exchanged during the annealing process in order to tint and/or strengthen the glass. Coloring may be effected.

8 Claims, 1 Drawing Figure

U.S. Patent  Feb. 17, 1976  3,938,977
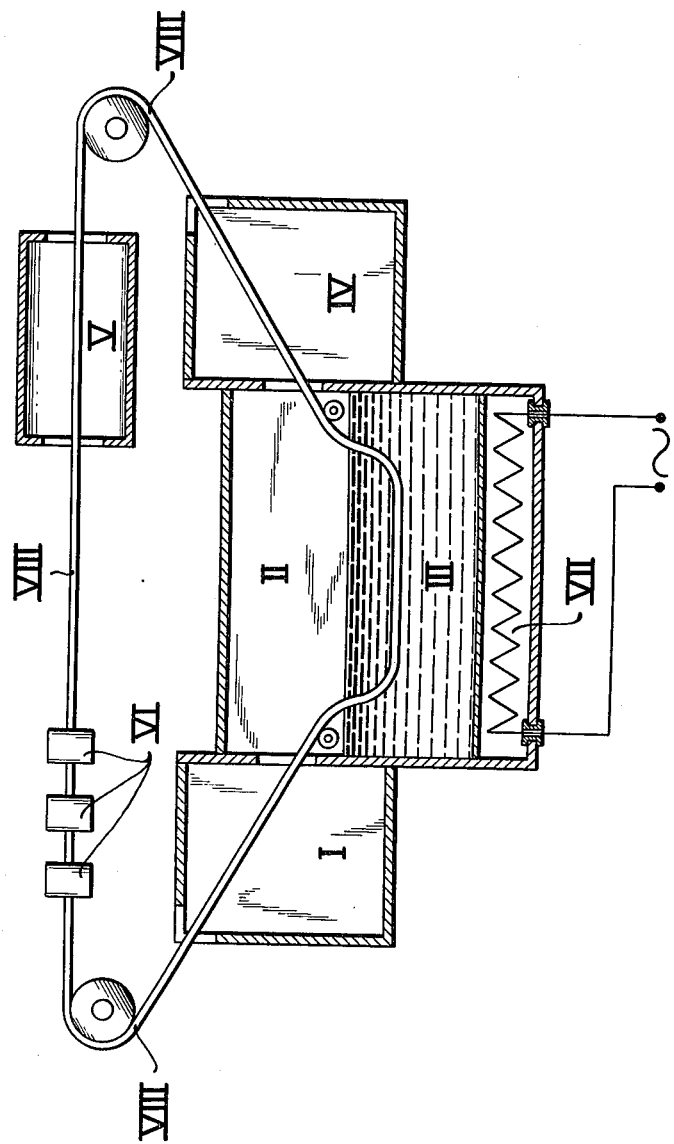

PROCESS FOR PRODUCING PHOTOCHROMICITY IN UNTREATED GLASSES OF SUITABLE COMPOSITION BY A TEMPERATURE TREATMENT IN A LIQUID

BACKGROUND OF THE INVENTION

This invention relates to a process for the manufacture of photochromic glass. More particularly, this invention relates to an improved process for annealing photochromic optical quality glass.

Photochromic optical quality glass, which undergoes a reversable photochemical reaction upon exposure to electromagnetic radiation resulting in a change in percent transmission along at least a portion of its characteristic transmission curve, is becoming increasingly popular optical glass, particularly for use in lenses. The glass itself can be any suitable optical quality glass to which one or more photochromic compounds are added in an amount sufficient to alter the light transmission curve of the glass upon exposure to electromagnetic radiation. One example of such glass now becoming popular is the photochromic sunglasses which rapidly darken upon exposure to sunlight and quickly lighten when out of the sun. While for purposes of sunglasses a neutral grey photochromic reaction is preferred so as to not tint the field of vision, in principle similar photochromic glasses are used in various applications which darken to a colored lens. Suitable photochromic compounds include but are not limited to silver in combination with halides.

In the production of photochromic glasses, it is generally necessary to carry out a high temperature annealing treatment of the non-photochromic glass composition (hereinafter referred to as untreated glass), which contains all of the components necessary for the photochromicity. In industrial fabrication, the untreated photochromic glass composition is cooled after the batch melting operation down to a temperature below about 500°C. The untreated glass is then heated to the so-called annealing temperature, usually 550°C–650°C, depending on the type of glass. The annealing temperature is maintained for a period of time sufficient to activate the photochromic properties therein, the length of time required generally varying inversely with the annealing temperature. The now photochromic finished glass is then cooled down to room temperature. Data concerning the processes taking place in the glass during the annealing are known in the art and given in the literature, e.g. Bach and Gliemeroth, Glastechn. Ber. 44: 305 (1971) or J. Amer. Ceram. Soc. 54: 528 (1971), the contents of which are incorporated by reference herein. These glasses and, above all, silver halide-containing glasses, e.g. those described in German Pat. Nos. 1,421,838 and 1,596,847 require extremely accurate control of time and temperature during the annealing process in order to prepare homogeneously photochromic products.

The silver halide-containing glasses described in the above references typically contain 0.015–1.9 wt %, preferably 0.2–0.9 wt % of silver halides present as silver chloride, silver bromide or silver iodide, or combinations thereof. These values are determined analytically and have the following typical compositions (synthetically):

| Broad | (Wt.-%) | Preferred |
|---|---|---|
| $SiO_2$ | 0–70 | 12–61 |
| $P_2O_5$ | 1–50 | 2–12 |
| $B_2O_3$ | 12–70 | 13–48 |
| $Li_2O$ | 0.7–8 | 2–7 |
| $Na_2O$ | 3–15 | 3–14 |
| $U_2O$ | 0–6 | 2–4 |
| $MgO$ | 2–16 | 3–10 |
| $ZnO$ | 0–20 | 2–8 |
| $BaO$ | 0–20 | 1–3 |
| $PbO$ | 1–60 | 3–38 |
| $La_2O_3$ | 0–25 | 2–13 |
| $ZrO_2$ | 1–10 | 2–6 |
| $Al_2O_3$ | 2–25 | 8–17 |

Metal oxides (other than above), 0–15 wt. -%; $Ag_2O$, 0.01–2.5 wt. -%; F, 0–10 wt. -%; Cl, Br, I, >0.01 wt. -%.

The temperature control problem during annealing has so far been solved by introducing the glass cooled to below 500°C into a furnace, which is heated as precisely as possible by electrical means or by gas, the glass either traveling continuously through a transfer furnace, or being removed at the appropriate time from a chamber furnace; in every case the glass leaves the controlled high temperature zone after an annealing time which is as far as possible within closely defined limits. Variances of about 5°C or 4% of the annealing time cause photochromic defects or inhomogeneities. Thus, two specimens of the same untreated glass, after tempering for 40 minutes at 638°C and 643°C, respectively, show color differences in the activated photochromic condition which can be clearly detected with the naked eye and which are so strong that these two specimen glasses cannot be used simultaneously as photochromic spectacle glasses in a single frame. Moreover, the photochormic properties of these two specimen glasses are different from one another: after being exposed to Xenon light XBO, 250 W, spacing 25 cm, the specimen tempered at 643°C has a light transmissivity lower by 3% at 545 nm than the specimen tempered at 638°C. The speed of regeneration of the specimen tempered at lower temperature is 2 minutes faster, related to the half life period.

However, it has heretofore not been possible to develop an alternative process for the temperature treatment of such untreated glasses without also damaging the quality of the photochromic properties.

One particular disadvantage of the temperature control processes of the prior art is seen in the fact that the "annealing temperature $t_a$" as used within this specification and being within the softening temperature range, lies considerably above the glass transformation temperature $t_g$ which is similar to the strain point temperature at $10^{14.5}$ poises of the photochromic glass, so that the glass is easily deformed as a plastic during the annealing process. An annealing operation could consequently heretofore be effected only by laying the glass on supports made of metal, kaolin, fire clay or similar high melting materials, the shape of support being assumed by the photochromic glass because of its own weight and plastic state at annealing temperatures.

An additional commercial disadvantage of the prior annealing processes lies in the time required for the annealing, which exceeds by several times the time required for the rest of the manufacturing process.

OBJECTS OF THE INVENTION

Accordingly it is an object of this invention to provide an improved process for preparing photochromic glass.

Another object of this invention is to provide a process for annealing untreated or inactive photochromic glass compositions.

An additional object of this invention is to provide a thermally efficient process for annealing photochromic glass.

A further object of this invention is to provide a process for accurately controlling temperature and heat transfer when activating photochromic glass compositions by annealing.

Other objects and advantages of this invention will become apparent to those skilled in the art upon further study of the specifications and appended claims.

SUMMARY OF THE INVENTION

Briefly, the above and other objects are attained in one aspect of the present invention by providing a process for thermally activating a photochromically inactive untreated glass composition containing all of the components necessary for photochromically active glass, characterized by activating said glass by immersion in a hot liquid bath having a sufficiently high temperature to photochromically activate said glass.

BRIEF DESCRIPTION OF THE DRAWING

The above and other objects of the present invention will become more fully apparent to those skilled in the art from the following detailed discussion, taken with the annexed drawing, which schematically illustrates one apparatus suitable for conducting the process of this invention.

DETAILED DISCUSSION

The process of this invention can be easily executed for annealing photochromic glass, and in this process constancy of the high temperature annealing zone as regards time and volume is standardized. A better utilization of the heat energy expended for annealing is achieved, i.e., the efficiency of the annealing procedure is greatly increased and the process is accordingly less costly. Finally, the process of this invention prevents deformation of preformed glass parts, e.g., semi-finished or finished photochromic spectacle glasses, during the annealing, and at the same time shortens the time and steps required for the annealing procedure.

According to the present invention, the entire annealing operation is effected in a bath of a liquid which is maintained at the required annealing temperature.

It has now been found that immersion of an untreated glass which is to be annealed into a liquid melt heated to the desired annealing temperature $t_a$ permits a substantially better utilization of energy in the annealing operation because of the better heat transfer at the boundary surfaces between untreated glass, liquid and heating element. In contrast to the usual prior art heat transfer between untreated glass, air and a heating element, thermal efficiency is improved without disadvantageous effects on either the untreated glass or the finished glass.

It was further found that the quality of a photochromic glass which has been annealed in the liquid melt according to this invention is subject to substantially fewer important color fluctuations and non-uniformities in the blackening density after light exposure and also regeneration behavior.

As the liquid annealing bath, it is possible to use any substance which is liquid in the range of the annealing temperature, i.e., which is above its melting point, but sufficiently far below its vaporization temperature or its decomposition temperature, and which does not show any reactions with either the untreated glass or the finished glass which could have a disadvantageous effect on the quality of either photochromic properties or of the glass surface.

Accordingly, molten metals, metal alloys, salts or salt mixtures can be used as annealing bath liquids. However, the known baths of liquid metals or metal alloys proved to be less than ideal for several reasons. For example, it was found that the protective gas atmosphere necessary when using known tin or tin alloy baths had a very disturbing effect with the charging and removal. Furthermore, these metal baths typically have a higher specific gravity than the photochromic glass which is to be annealed; consequently, the glass floats on the surface of the bath. As a result, continual heat transfer is effected only on one side of the glass, while the other side of the glass is exposed to the protective gas atmosphere and its greater temperature fluctuations resulting in a less satisfactory heat transfer. While such partial immersion is suitable for limited applications, total immersion annealing is generally preferred.

It has been found that molten salts or salt mixtures are considerably better suited for carrying out the process of the present invention, because their density can be selected to lie in the range of density of the glass which is to be annealed. With a decidedly lower or higher density of the liquid salt melt as compared with that of the glass, e.g. a difference of >—0.5 or +0.05 g/cc. density, however, there is again the danger of plastic deformation under the actual weight of the glass or upward force of the bath (assuming the glass is forcibly immersed by means of a foraminous enclosed conveyor, for example), although this is less than occurs when the tempering takes place in air.

It has been found that the most desirable annealing results are obtained with salt melts of which the density is substantially the same as or somewhat lower than that of the glass to be annealed. By substantially the same density is meant a density sufficiently close to that of the glass at annealing temperatures so that plastic deformation does not occur during annealing. This tolerance range can be defined by $$D_{salt\ melt} = D_{glass} \quad \begin{array}{l} -0.5 \text{ g/cc, preferably } -0.05 \text{ g/cc} \\ +0.05 \text{ g/cc, preferably } +0.003 \text{ g/cc} \end{array}$$

$D$ being the density at the annealing temperature.

The smallest amount of deformation of the photochromic glass is produced with such salt melts at an annealing temperature $t_a$ which is substantially equal to or lower than the glass transformation temperature $t_g +$ 150°C. Thus, it is possible, for example, with a salt bath of (wt.-%):

| a) | | or | b) | |
|---|---|---|---|---|
| 28% KCl | | | 12% KCl | |
| 35% KNO$_3$ | | | 12% NaNO$_3$ | |
| 36% Ba(NO$_3$)$_2$ | | | 75% Ba(NO$_3$)$_2$ | |
| 1% KMnO$_4$ | | | 1% KMnO$_4$ | | and at an annealing temperature $t_a = 605°C$, to anneal untreated spectacle glasses with a composition (in parts by weight) of

| | |
|---|---|
| $SiO_2$ | 60.35 |
| $B_2O_3$ | 18.05 |
| $Al_2O_3$ | 9.60 |
| $P_2O_5$ | 1.00 |
| $K_2O$ | 2.00 |
| $Na_2O$ | 8.00 |
| $Li_2O$ | 2.00 |
| $ZrO_2$ | 1.00 |
| $BaO$ | 2.00 |
| $Ag_2O$ | 0.30 |
| $Cl$ | 0.30 |
| $Br$ | 0.25 |
| $F$ | 0.80 | for an annealing time of only 70 minutes to photochromic activation without the polished surfaces visibly showing any deformation. The density of the salt bath, calculated back to 20°C is 2.54 g/cc. The transformation temperature of the glass is 542°C.

All data concerning density in the following description are at 20°C; the densities at a given annealing temperature $t_a$ must be calculated separately for the glass and salt bath.

In principle, a large number of salts is suitable for this process. Suitable salts include but are not limited to the examples set forth in the following table, in which are also indicated the densities, the melting temperatures and the boiling temperatures. On the basis of these components, one skilled in the art can conveniently prepare salt mixtures for accurately adapting the density of the salt mixture to the density of the glass. For this purpose, phase diagrams given in the literature are used (e.g. Phase Diagrams of Ceramists, Amer. Ceram. Soc., Columbus, Ohio, USA). These phase diagrams indicate whether the salt mixture is liquid at the annealing temperature $t_a$, and the densities of the salt mixtures can be calculated or shown graphically from the percentage quantities and densities of the individual components.

Because of the good temperature constancy of such salt baths, which is a function of their heat capacity, annealing conditions can be shifted to higher temperatures and shorter times than can be practically used when annealing in a hot gas.

Among a larger number of salts suitable in the process of the present invention and shown in the following Table, preferred are:

| | |
|---|---|
| $Ba(NO_3)_2$ | $(KPO_3)_6$ |
| $PbCl_2$ | $KMnO_4$ |
| $LiBr$ | $AgNO_3$ |
| $LiCl$ | $NaCl$ |
| $MnCl_2$ | $NaF$ |
| $NiCl_2$ | $NaNO_3$ |
| $KCl$ | $Na_2WO_4$ |
| $KBr$ | $Sr(NO_3)_2$ |
| $KNO_3$ | $ZnF_2$ | and mixtures thereof. Of these, especially preferred are:
  $Ba(NO_3)_2$
  $MnCl_2$
  $KCl$
  $KNO_3$
  $KMnO_4$
  $NaNO_3$

| Substance | Density | Melting Temperature | Boiling Temperature |
|---|---|---|---|
| $Sb_2S_3$ | 4.64 | 550° C | 1150° C |
| $As_2S_3$ | 3.43 | 300° C | 707° C |
| $BaCO_3$ | 4.43 | 811° C | 1450° C |
| $BaCl_2$ | 3.917 | 925° C | 1560° C |
| $Ba(NO_3)_2$ | 3.24 | 592° C | d |
| $CdBr_2$ | 5.192 | 567° C | 863° C |
| $CdCl_2$ | 4.047 | 568° C | 960° C |
| $CdI_2$ | 5.670 | 387° C | 796° C |
| $CaCl_2$ | 2.15 | 772° C | 1600° C |
| $CaI_2$ | 3.9563 | 740° C | 1100° C |
| $CeCl_3$ | 3.92 | 848° C | 1727° C |
| $CsBr$ | 4.44 | 637° C | 1300° C |
| $CsCl$ | 3.988 | 646° C | 1290° C |
| $CsF$ | 4.115 | 682° C | 1251° C |
| $CsI$ | 4.510 | 621° C | 1280° C |
| $CsS_2$ | — | 460° C | 800° C |
| $Cs_2S_3$ | — | 217° C | 780° C |
| $CrI_2$ | 5.196 | 856° C | 800° C |
| $CoCl_2$ | 3.386 | 620° C | 1049° C |
| $CuF$ | — | 908° C | 1100° C |
| $CuCl$ | 4.14 | 430° C | 1490° C |
| $CuCl_2$ | 3.386 | 620° C | 993° C |
| $CuI$ | 5.62 | 605° C | 1290° C |
| $LaCl_3$ | 3.842 | 860° C | 1000° C |
| $PbBr_2$ | 6.66 | 373° C | 916° C |
| $PbCl_2$ | 5.85 | 501° C | 950° C |
| $PbF_2$ | 8.24 | 855° C | 1290° C |
| $PbI_2$ | 6.16 | 402° C | 954° C |
| $LiBr$ | 3.464 | 547° C | 1265° C |
| $Li_2CO_3$ | 2.11 | 723° C | 1310° C |
| $LiCl$ | 2.068 | 614° C | 1360° C |
| $LiF$ | 2.635 | 842° C | 1676° C |
| $LiI$ | 3.495 | 450° C | 1180° C |
| $MgCl_2$ | 2.316–2.33 | 708° C | 1412° C |
| $MnCl_2$ | 2.977 | 650° C | 1190° C |
| $MnSO_4$ | 3.25 | 700° C | 850° C |
| $NiCl_2$ | 3.55 | 1001° C | 973° C |
| $KBr$ | 2.75 | 730° C | 1435° C |
| $KCl$ | 1.984 | 776° C | 1500° C |
| $KF$ | 2.48 | 846° C | 1505° C |
| $KNO_3$ | 2.109 | 334° C | — |
| $KI$ | 3.13 | 686° C | 1330° C |
| $(KPO_3)_6$ | 2.107 | 810° C | 1320° C |
| $K_2SO_4$ | 2.662 | 588° C | 1689° C |
| $K_2S_4$ | — | 145° C | 850° C |
| $K_2S_2$ | — | 470° C | — |
| $K_2S$ | 1.805 | 840° C | — |
| $KMnO_4$ | 2.703 | 240° C | — |
| $KI$ | 3.13 | 686° C | 1330° C |
| $RbBr$ | 3.35 | 682° C | 1340° C |
| $RbI$ | 3.55 | 642° C | 1300° C |
| $RbCl$ | 2.80 | 715° C | 1390° C |
| $SmBr_2$ | 5.1 | 508° C | 1880° C |
| $Se$ | 4.81 | 217.4–220° C | 684.8° C |
| $AgBr$ | 6.473 | 432° C | 1300° C |
| $AgCl$ | 5.56 | 455° C | 1550° C |
| $AgF$ | 5.852 | 435° C | 1159° C |
| $AgI$ | 6.010 | 558° C | 1506° C |
| $AgNO_3$ | 4.352 | 212° C | 444° C |
| $Ag_2Se$ | 8.00 | 880° C | d |
| $Ag_2SO_4$ | 5.45 | 652° C | 1085° C |
| $Ag_2S$ | 7.317 | 825° C | d |
| $NaBO_2$ | 2.464 | 966° C | 1434° C |
| $NaBr$ | 3.203 | 755° C | 1390° C |
| $Na_2CO_3$ | 2.532 | 815° C | d |
| $NaCl$ | 2.165 | 801° C | 1413° C |
| $Na_3AlF_6$ | 2.90 | 1000° C | — |
| $NaF$ | 2.558 | 988° C | 1695° C |
| $Na_2PO_3F$ | — | 625° C | — |
| $NaI$ | 3.67 | 651° C | 1304° C |
| $NaNO_3$ | 2.261 | 306.8° C | — |
| $NaNO_2$ | 2.168 | 271° C | — |
| $Na_2SO_4$ | — | 884° C | — |
| $Na_2S_2O_7$ | 2.658 | 400.9° C | 460° C |
| $Na_2Te$ | 2.90 | 953° C | — |
| $Na_2WO_4$ | 4.179 | 698° C | — |
| $Sr$ | 2.6 | 774° C | 1366° C |
| $SrCl_2$ | 3.052 | 873° C | 1250° C |
| $SrCl_2 \cdot SrF_2$ | 4.18 | 962° C | — |
| $Sr(NO_3)_2$ | 2.986 | 400° C | 645° C |
| $TeCl_4$ | 3.26 | 224° C | 380° C |
| $TlBr$ | 7.557 | 480° C | 815° C |
| $TlCl$ | 7.004 | 430° C | 720° C |
| $Tl_2O$ | 9.52 | 300° C | 1080° C |
| $Tl_2SO_4$ | 6.77 | 632° C | d |
| $ThCl_4$ | 4.59 | 770° C | 928° C |
| $Sn$ | 5.75 | 231° C | 2260° C |
| $Sn$ | 7.28 | 231° C | 2260° C |
| $SnCl_2$ | 3.95 | 246° C | 652° C |
| $SnJ_2$ | 5.285 | 320° C | 717° C |
| $SnO_2$ | 6.95 | 1127° C | 1800° C |

-continued

| Substance | Density | Melting Temperature | Boiling Temperature |
|---|---|---|---|
| SnSe | 6.179 | 861° C | — |
| SnS | 5.22 | 882° C | 1230° C |
| TiI$_2$ | 4.99 | 600° C | 1000° C |
| WCl$_6$ | 3.52 | 275° C | 346.7° C |
| UBr$_4$ | 5.35 | 515° C | 792° C |
| UCl$_4$ | 4.87 | 590° C | 792° C |
| UF$_4$ | 6.70 | 960° C | — |
| V$_2$O$_5$ | 3.357 | 690° C | 1750° C |
| YbCl$_2$ | 5.08 | 702° C | 1900° C |
| YCl$_3$ | 2.67 | 721° C | 1507° C |
| Zn | 7.14 | 419° C | 907° C |
| Zn$_3$Sb$_2$ | 6.33 | 570° C | — |
| 3ZnO·2B$_2$O$_3$ | 4.22 | 980° C | — |
| ZnBr$_2$ | 4.201 | 394° C | 650° C |
| ZnCl$_2$ | 2.91 | 283° C | 732° C |
| ZnF$_2$ | 4.95 | 872° C | 1500° C |
| ZnI$_2$ | 4.7364 | 446° C | 624° C |
| Zn(C$_{12}$H$_{35}$O$_2$)$_2$ | — | 130° C | — |
| ZrF$_4$ | 4.43 | 600° C | — |

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

EXAMPLE 1

This example shows that it is now possible in accordance with the process of the invention for photochromic untreated circular glass discs having a diameter of 60 mm and a thickness of 4 mm, to be continuously annealed with the same throughput as that in which they are formed from the molten glass, e.g., at about 12 discs per minute with a glass having a density of 3.44 g/cc. The apparatus used for this purpose is shown diagrammatically in FIG. 1, in which I is a preheating chamber, II the space above the salt bath, III is a salt bath, IV is a cooling chamber, V is a washing chamber, VI represents holding cages for the glasses to be annealed, VII indicates an electrical heating element of the bath and VIII shows an endless conveyor belt. Whereas the electric heating in air had a simple on/off control with a tolerance of ±5°C, there was a temperature constancy of ±1°C in the molten bath, which can only be obtained with maximum effort in a conventional furnace with the best currently available electric heating and air circulation.

In this annealing assembly, 12 circular discs per minute were continuously annealed at $t_a = 600°C$ (i.e., $t_g + 124°$). The composition of the glass being annealed was, in parts by weight (synthesis):

| | |
|---|---|
| SiO$_2$ | 1.50 |
| B$_2$O$_3$ | 46.30 |
| Al$_2$O$_3$ | 12.50 |
| PbO | 35.60 |
| KBr | 1.44 |
| KI | 1.44 |
| LiF | 0.29 |
| Ag$_2$O | 0.38 |
| K$_2$Cr$_2$O$_7$ | 0.01 |

The density of the salt bath at 20°C was 3.48 g/cc., and the salt bath comprised 65 wt % NaF and 35 wt % ZnF.

EXAMPLE 2

The possibility of extremely accurate temperature control during annealing by means of immersion of photochromic glasses in liquid melts according to the present invention enables the production of accurately defined and controlled color shades of the glass in the activated state during annealing, which shades were formerly considered as undesirable production fluctuations with conventional manufacturing and annealing procedures.

In the same annealing assembly as used in Example 1, 3 lots of discs of 100 pieces each, all consisting of the glass composition described in the following Example 3, were continuously annealed in a salt bath. The composition of the salt bath was as follows:

| | |
|---|---|
| KCl | 12 wt.-%; |
| NaNO$_3$ | 13 wt.-%; |
| Ba(NO$_3$)$_2$ | 75 wt.-%; |
| (D = 2.5 g/cc); | |

The annealing conditions for the 3 lots and the color shades obtained were as follows:

| | Annealing Time (Sec.) | Annealing Temperature (°C.) | Color Shade | Transmission (%)* | Half Life Period (min.)** |
|---|---|---|---|---|---|
| 1) | 98 | 680 ± 1 | Gray | 38 ± 1.5 | 8.8 ± 0.2 |
| 2) | 98 | 672 ± 1 | Grayish-brown | 40 ± 1.4 | 8.0 ± 0.2 |
| 3) | 100 | 665 ± 1 | Brown | 42 ± 1.0 | 7.5 ± 0.3 |

*/** = after standard irradiation as explained in Example 3.

It was moreover found that other processes can be carried out simultaneously during the annealing of photochromic glasses. For example, with a suitable salt bath composition, an ion exchange as known per se in and near the glass surface of the photochromic glass can be effected in such a way that a compressive stress zone is established in and near the glass surface after cooling, whereby the strength of the photochromic glass is increased. But the fact that this chemical hardening by ion exchange is effected simultaneously with the annealing is not an object of the invention.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

In addition, it is to be noted that the terms "photochromic" and "photochromically" as defined hereinabove are to be considered synonymous with "phototropic" and "phototropically", respectively; it will be appreciated that photochromicity can be positive or negative, i.e., darkening or lightening upon exposure to the appropriate electromagnetic radiation.

What is claimed is:

1. In a process for thermally activating a photochromically inactive untreated glass composition containing sufficient silver halide for obtaining photochromically active glass, said silver halide being substantially uniformly distributed therein, the improvement which comprises immersing said glass for a sufficient time in a substantially silver-free molten salt bath having a sufficiently high annealing temperature to photochromically activate said glass, wherein the density of the molten salt is substantially the same as or somewhat lower than the density of the glass so that deformation of said glass during the annealing is essentially prevented, said process of photochromic activation in said molten salt bath being conducted in the substantial absence of ion exchange for the purpose of chemically strengthening or tinting the glass.

2. A process according to claim 1 wherein the temperature of said bath is at least equal to the glass transition temperature of said glass composition and does not exceed said glass transition temperature by more than 120° C.

3. A process according to claim 1 wherein said molten bath comprises a mixture of at least two salts.

4. A process according to claim 1 wherein the density of said molten salt is not substantially greater than the density of said glass composition and not more than 0.5 g/cc less than the density of said glass composition.

5. A process according to claim 4 wherein the molten salt further includes at least one inorganic coloring oxide.

6. A process according to claim 4 wherein said glass is an optical lens.

7. A process according to claim 6 conducted continuously such that lenses are continuously annealed at the same rate at which lenses are normally formed from molten glass.

8. A process according to claim 7 wherein the deviation of the temperature of the molten said is maintained at not more than 1°Centigrade throughout the annealing step.

* * * * *